(12) United States Patent
Tseng et al.

(10) Patent No.: US 9,979,803 B2
(45) Date of Patent: May 22, 2018

(54) ELECTRONIC DEVICE HAVING LATCHING PORTIONS

(71) Applicant: FOXCONN INTERCONNECT TECHNOLOGY LIMITED, Grand Cayman (KY)

(72) Inventors: Wei-Ta Tseng, New Taipei (TW); Shun-Jung Chuang, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days. days.

(21) Appl. No.: 15/238,887

(22) Filed: Aug. 17, 2016

(65) Prior Publication Data

US 2017/0055357 A1 Feb. 23, 2017

(30) Foreign Application Priority Data

Aug. 17, 2015 (TW) .............................. 104126670 A

(51) Int. Cl.
    *H05K 5/00* (2006.01)
    *H04M 1/02* (2006.01)
    *G06F 1/16* (2006.01)

(52) U.S. Cl.
    CPC ............ *H04M 1/0202* (2013.01); *G06F 1/16* (2013.01)

(58) Field of Classification Search
    CPC .............................. G06F 1/16; H04M 1/0202
    USPC ...................................................... 361/732
    See application file for complete search history.

(56) References Cited

U.S. PATENT DOCUMENTS

| 4,104,491 | A | * | 8/1978 | Duble | H01H 9/223 |
|---|---|---|---|---|---|
| | | | | | 200/50.15 |
| 4,553,192 | A | * | 11/1985 | Babuka | H05K 3/325 |
| | | | | | 361/743 |
| 6,816,388 | B2 | * | 11/2004 | Junkins | H05K 7/1418 |
| | | | | | 361/727 |
| 7,120,032 | B2 | * | 10/2006 | Lin | G06F 1/184 |
| | | | | | 361/679.32 |
| 7,817,003 | B2 | | 10/2010 | Fullerton et al. | |
| 7,999,645 | B2 | | 8/2011 | Sarda | |
| 8,534,628 | B2 | * | 9/2013 | Lu | G06F 1/184 |
| | | | | | 248/309.1 |
| 2008/0050937 | A1 | * | 2/2008 | Miyao | G06K 13/08 |
| | | | | | 439/64 |
| 2015/0288422 | A1 | | 10/2015 | Fishman et al. | |

FOREIGN PATENT DOCUMENTS

TW      M377840      4/2010

\* cited by examiner

*Primary Examiner* — Hung S Bui
(74) *Attorney, Agent, or Firm* — Wei Te Chung; Ming Chieh Chang

(57) ABSTRACT

An electronic device includes: a framework; a number of modules assembled detachably to the framework; and a number of latching portions assembling the modules on the framework. Each latching portion includes a ball spring beam having a first positioning portion and a first contacting beam, a reinforcement beam having a second positioning portion attached to the first positioning portion and a second contacting beam spaced from the first contacting beam, and a screw affixing the first positioning portion and the second positioning portion to the framework. The first contacting beam has a tuber mated with the module.

6 Claims, 9 Drawing Sheets

ELECTRONIC DEVICE HAVING LATCHING PORTIONS

BACKGROUND OF THE INVENTION

1. Field of the Invention

The present disclosure relates generally to an electronic device, and more particularly to an electronic device with a number of latching portions.

2. Description of Related Arts

U.S. Patent Application Publication No. 20150288422 discloses a system for enabling a chassis-coupled modular mobile electronic device. The system includes a modular electronic device enablement system, a set of module couplers, and a framework or chassis. The module couplers preferably couple modules mechanically to the chassis. The module couplers may have detents or structures that resist movement of the modules when they are fully coupled, including spring-loaded balls mounted on a surface of the module that fits into corresponding shallow holes on a complementary surface of the module coupler. The module coupler may also retain the module using a latching mechanism, e.g., a pin that when extended prevents the module from being removed, or a snap latch that holds the module tight against the contact surfaces of the module coupler when engaged. The module couplers preferably have mechanical guides or other guides to aid in aligning the module during coupling and in module retention through friction.

An electronic device having improved latching portions is desired.

SUMMARY OF THE INVENTION

Accordingly, an object of the present invention is to provide an electronic device having a number of latching portions for grouping a plurality of modules on a chassis or framework.

To achieve the above object, an electronic device comprises: a framework; a plurality of modules assembled detachably to the framework; and a plurality of latching portions assembling the modules on the framework, each latching portion comprising a ball spring beam comprising a first positioning portion and a first contacting beam, a reinforcement beam having a second positioning portion attached to the first positioning portion and a second contacting beam spaced from the first contacting beam, and a screw affixing the first positioning portion and the second positioning portion to the framework, the first contacting beam having a tuber mated with the module.

Other objects, advantages and novel features of the invention will become more apparent from the following detailed description when taken in conjunction with the accompanying drawings.

DETAILED DESCRIPTION OF THE PREFERRED EMBODIMENT

Figure 1:
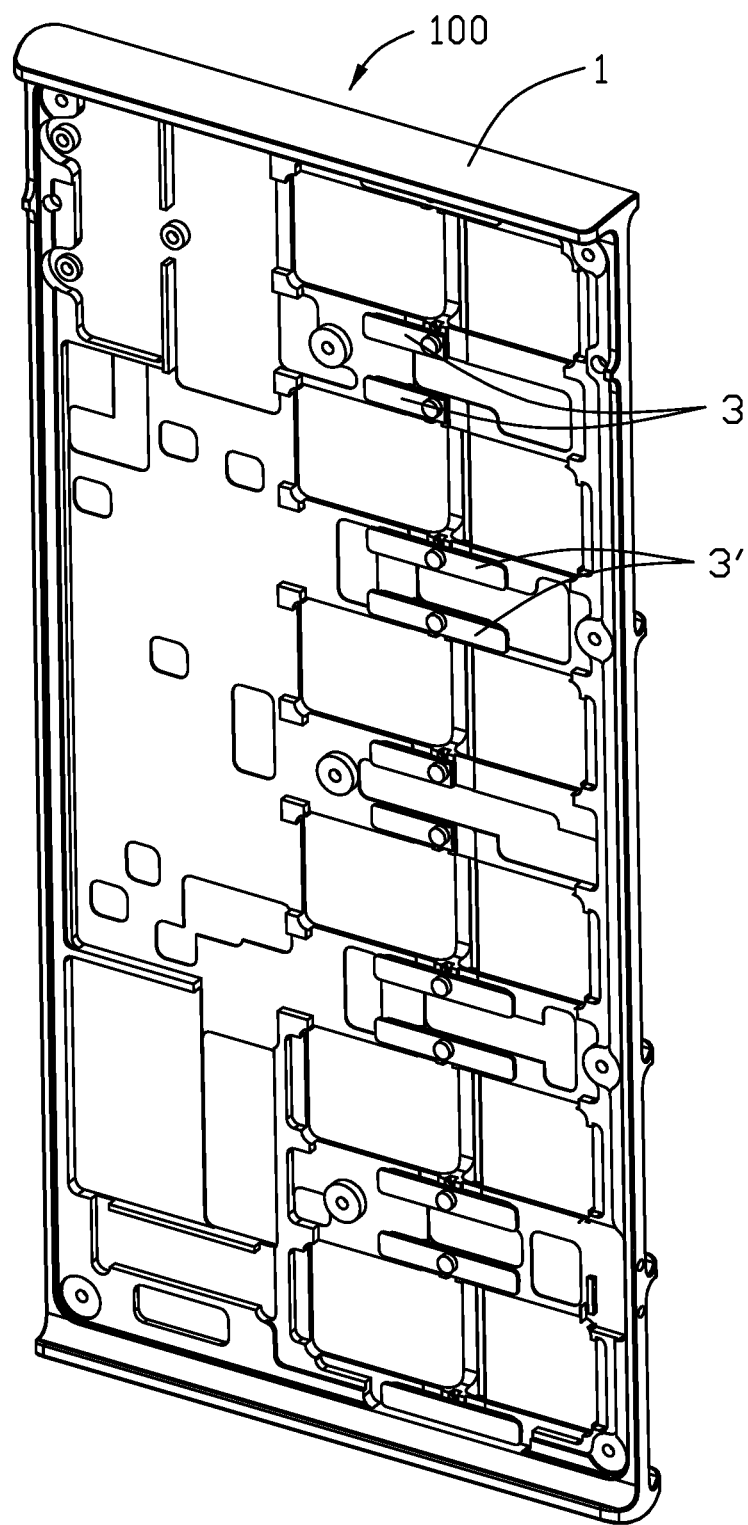
FIG. 1 is a perspective, assembled view of an electronic device in a first embodiment.

Reference will now be made in detail to the preferred embodiment of the present invention.

Referring to FIGS. 1 to 9, an electronic device 100 includes a framework 1, a number of latching portions 3, 3', 3" and a number of modules 101 detachably attached to the framework 1 via the latching portions 3, 3', 3". The framework 1 extends in a horizontal direction and defines a longitudinal direction, a transverse direction perpendicular to the longitudinal direction, and a vertical direction perpendicular to the transverse direction and the longitudinal direction. The modules 101 are attached to/detached from the framework 1 along the vertical direction.

Referring to FIGS. 2-5 and 7-8 in a first through third embodiments, each latching portion 3, 3', 3" includes a screw or attaching pin 31, 31', 31" a ball spring beam 32, 32', 32", and a reinforcement beam 33, 33', 33". The screw 31, 31', 31" is used for fastening the ball spring beam 32, 32', 32" and the reinforcement beam 33, 33', 33" to the framework 1. The screw 31, 31', 31" includes a base portion 311, 311', 311" and a post portion 312, 312', 312" extending upwardly from the base portion 311, 311', 311" along the vertical direction. The diameter of the base portion 311, 311', 311" is longer than the diameter of the post portion 312, 312', 312". The reinforcement beam 33, 33', 33" is fastened to the screw 31, 31', 31" to ball spring beam 32, 32', 32".

The ball spring beam 32, 32', 32" includes a first positioning portion 321, 321', 321" a first contacting beam 322, 322', 322" in a different plane with the first positioning portion 321, 321', 321" and a stepped portion 323, 323', 323" connected the first positioning portion 321, 321', 321" and the first contacting beam 322, 322', 322". The first positioning portion 321, 321', 321" defines a first opening 320, 320', 320" and the post portion 312, 312', 312" is inserted through the first opening 320, 320', 320". The first contacting beam 322, 322', 322" includes a number of tubers 324, 324', 324" latching with the modules. The tubers 324, 324', 324" are formed at one surface of the ball spring beam 32, 32', 32" separated from the reinforcement beam 33, 33', 33".

The reinforcement beam 33, 33', 33" includes a second positioning portion 331, 331', 331" and a second contacting beam 332, 332', 332" coplanar with the second positioning portion 331, 331', 331". The second positioning portion 331, 331', 331" defines a second opening for insertion of the post portion 312, 312', 312". When the screw 31, 31', 31" is inserted though the first opening 320, 320', 320" and the second opening 330, 330', 330", the first positioning portion 321, 321', 321" and the second positioning portion 331, 331', 331" are connected with each other by spot welding for preventing the relative rotation between the ball spring beam 32, 32', 32" and the reinforcement beam 33, 33', 33". The first contacting beam 322, 322', 322" is separated from the second contacting beam 332, 332', 332" along the vertical direction.

Figure 2:
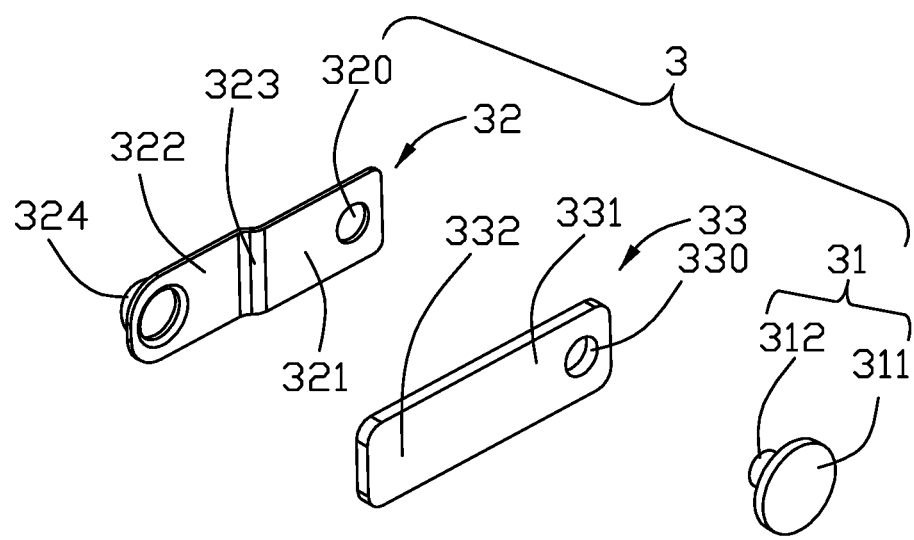
FIG. 2 is a perspective, exploded view of a latching portion of the electronic device in the first embodiment.
Figure 3:
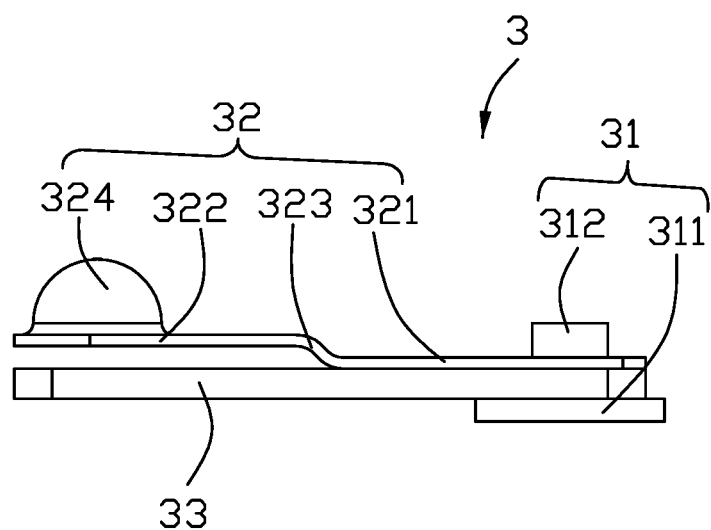
FIG. 3 is an elevation view of the latching portion of the electronic device in the first embodiment.

Referring to FIGS. 2 to 3, the latching portions 3 in the first embodiment are shown. The second positioning portion 331 and the second contacting beam 332 are located at two sides of the reinforcement portion 33. The first positioning portion 321 is located at one side of the stepped portion 323 corresponding to the second positioning portion. The first contacting beam 322 is located at the other side of the stepped portion 323. The first opening 320 is located at one side of the first positioning portion 321. The second opening 330 is located at one side of the second positioning portion 331 corresponding to the first opening 320. The screw 31 is inserted through the first opening 320 and the second opening 330 to connect the ball spring beam 32 and the reinforcement portion 33.

Figure 4:
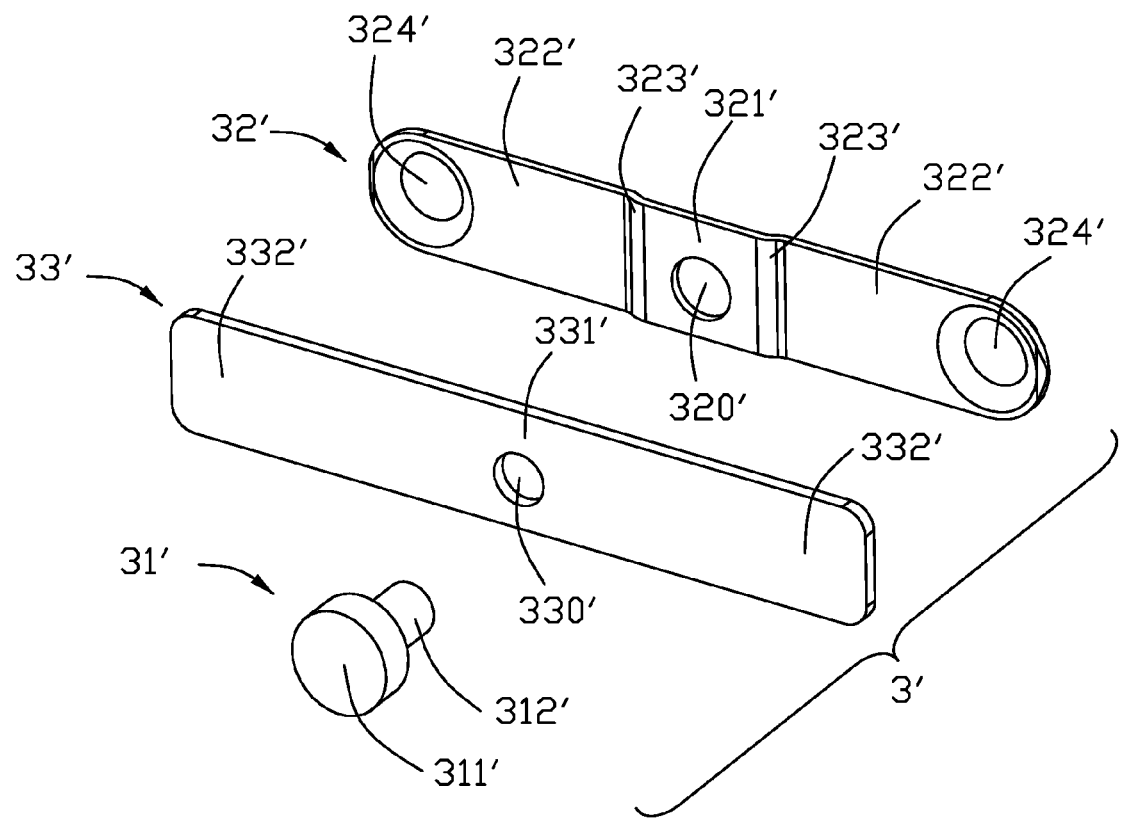
FIG. 4 is a perspective, exploded view of the latching portion of the electronic device in a second embodiment.
Figure 5:
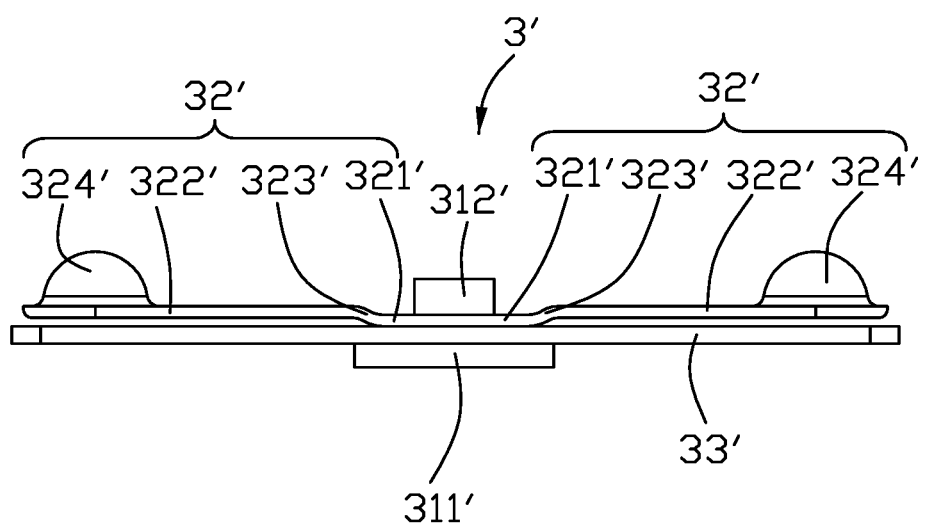
FIG. 5 is an elevation view of the latching portion of the electronic device in the second embodiment.
Figure 6:
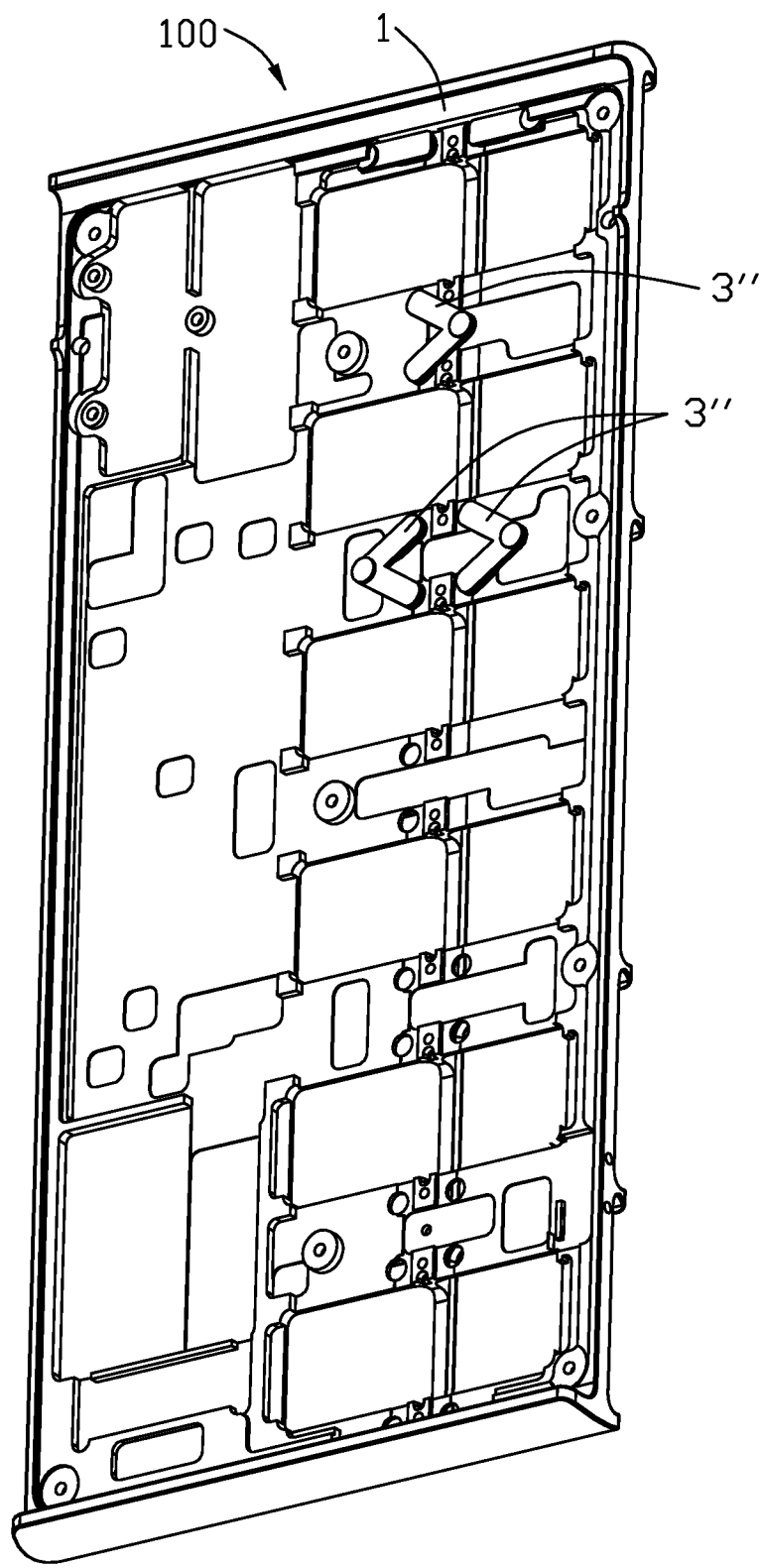
FIG. 6 is a perspective, assembled view of the electronic device in the second embodiment.

Referring to FIGS. 4 to 5, the latching portions 3' in the second embodiment are shown. The second positioning portion 331' is located at a middle of the reinforcement portion 33'. The second opening 330' is located at a middle of the second positioning portion 331'. The second contacting beam 332' is divided into two parts located at two sides of the second positioning portion 331'. The first positioning portion 321' is located at a middle of the ball spring beam 32' corresponding to the second positioning portion 331'. The first opening 320' is located at a middle of the first positioning portion 321'. The first contacting beam 322' is divided into two parts located at two sides of the first positioning portion 321' and connected with the stepped portion 323'. The screw 31' is inserted through the first opening 320' and the second opening 330' to connect the ball spring beam 32' and the reinforcement portion 33'.

Figure 7:
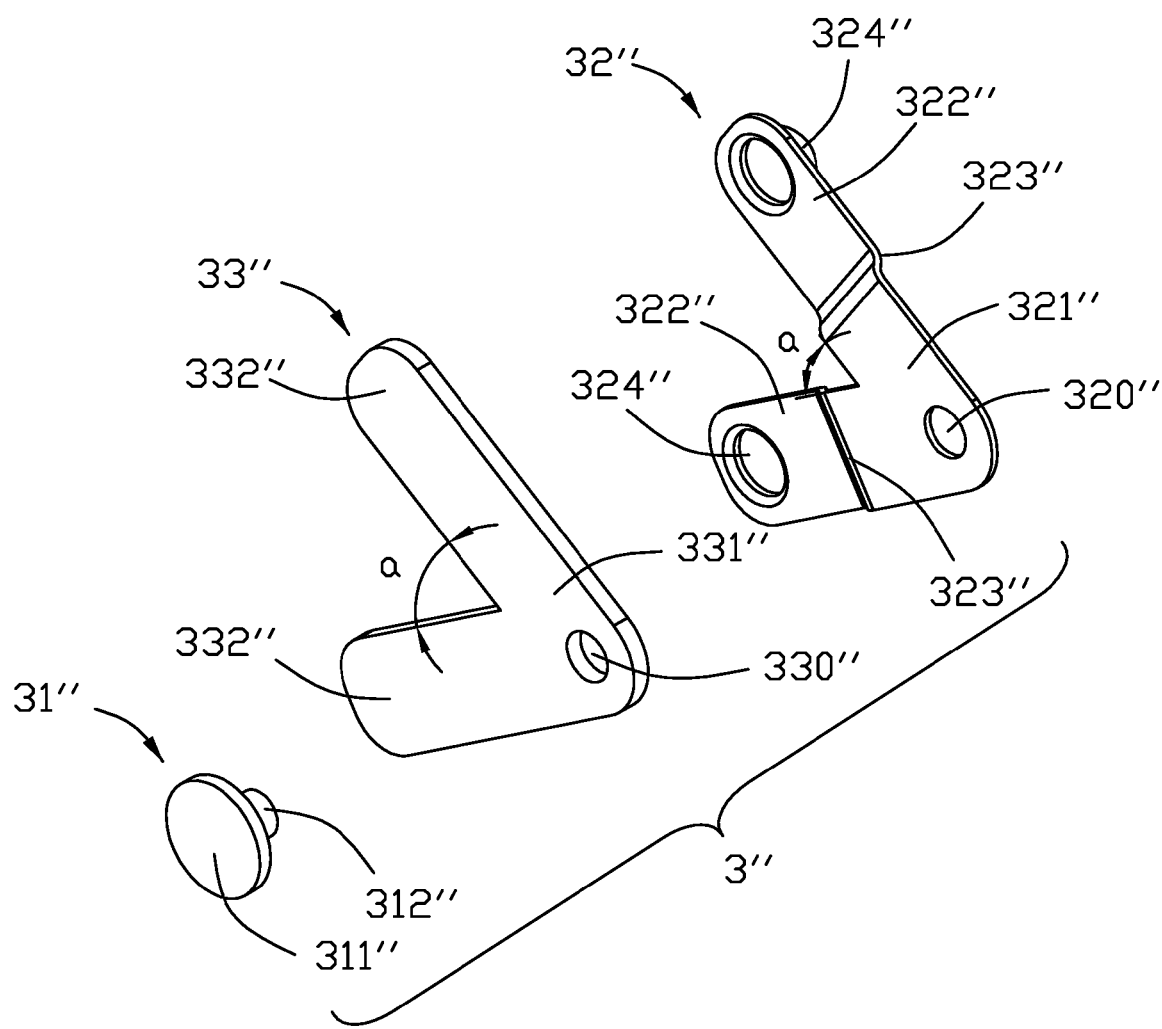
FIG. 7 is a perspective, exploded view of the latching portion of the electronic device in a third embodiment.
Figure 8:
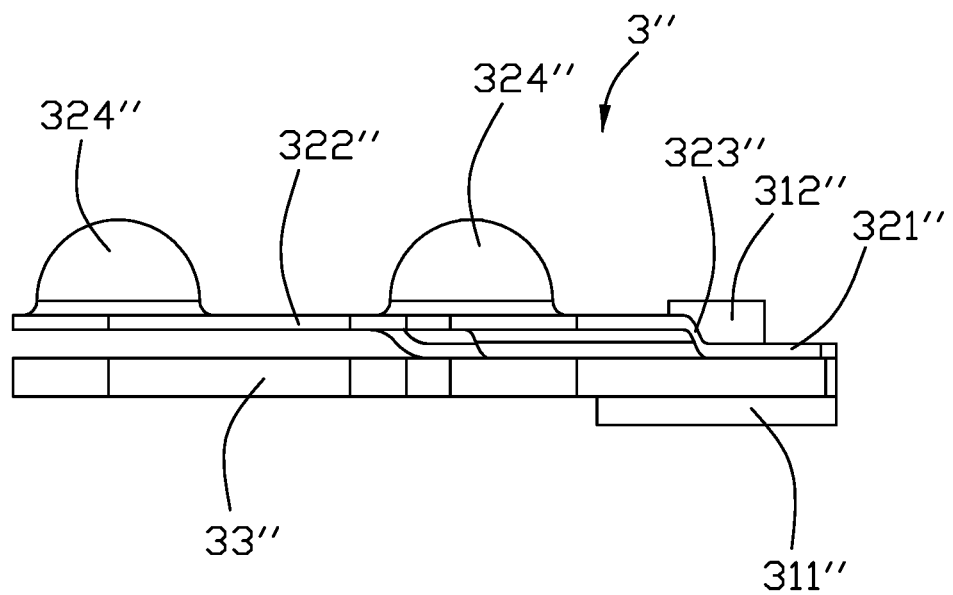
FIG. 8 is an left view of the latching portion of the electronic device in the third embodiment.
Figure 9:
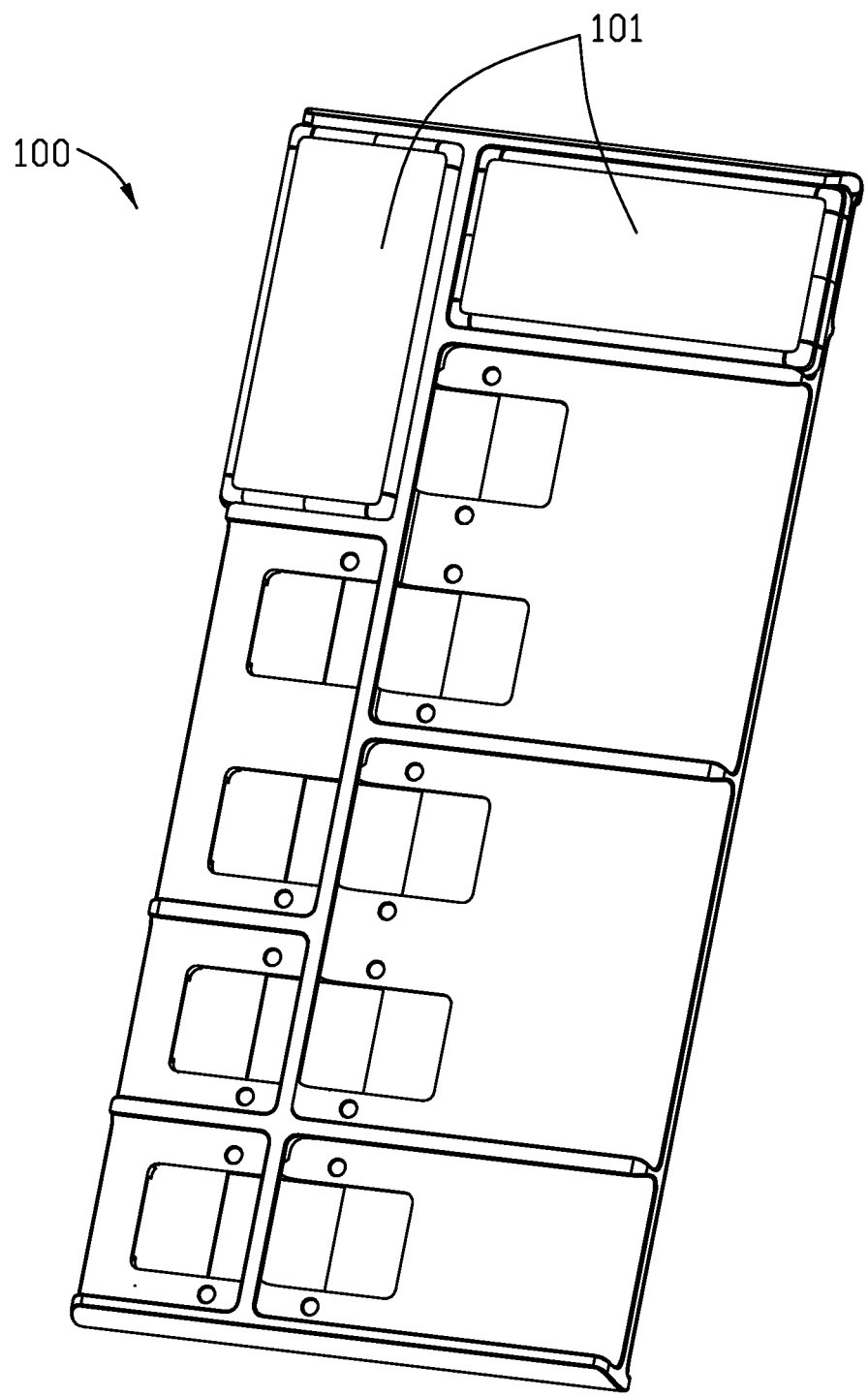
FIG. 9 is a back view of two modules attached to the electronic device.

Referring to FIGS. 7 to 8, the latching portions 3" in the third embodiment are shown. The first contacting beam 322" is divided into two parts extending from the first positioning portion 321". The two parts of the first contacting beam 322" have therebetween a first angle between 0 and 180 degree. The second contacting beam 332" is divided into two parts extending from the second positioning portion 331". The two parts of the second contacting beam 332" have therebetween a second angle equal to the first angle.

The ball spring beam 32, 32', 32" and the reinforcement beam 33, 33', 33" are made of two different materials. The thickness of the ball spring beam 32, 32', 32" is smaller than the thickness of the reinforcement beam 33, 33', 33". The ball spring beam 32, 32', 32" is greater than the reinforcement beam 33, 33', 33" in ductility and the ball spring beam 32, 32', 32" is weaker than the reinforcement beam 33, 33', 33" in strength. When the modules 101 are assembled to framework 1, the modules 101 are resisted against by the tubers 324 of the latching portions 3. The first contacting beam 322, 322', 322" is susceptible to rotate caused by compression for the ductility of the ball spring beam 32, 32', 32". The reinforcement beam 33, 33', 33" could support the ball spring beam 32, 32', 32" for the strength of the reinforcement beam 33, 33', 33". The first contacting beam 322, 322', 322" is deflected downwardly into contacting with the second contacting beam 332, 332', 332". The ball spring beam 32, 32', 32" continues to press downwardly against the reinforcement beam 33, 33', 33" to reduce the amount of compression avoiding permanent deformation of the reinforcement beam 33, 33', 33".

When the modules 101 of the electronic device 100 need to be replaced, the modules 101 are detached from the framework 1, the retention force between the framework 1 and the modules 101 needs to be overcome.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electronic device comprising:
   a framework defining two opposite first and second surfaces in a vertical direction with a plurality of through holes extending therethrough in said vertical direction;
   a plurality of modules detachably attached upon the first surface; and
   a plurality of latching portions positioned upon the second surface to assemble the modules on the framework, each latching portion comprising a ball spring beam and a reinforcement beam, said spring beam being sandwiched between the reinforcement beam and the framework, said ball spring beam comprising a first positioning portion and a first contacting beam, said reinforcement beam having a second positioning portion and a second contacting beam, said second positioning portion attached to the first positioning portion and further fixed to the framework, said second contacting beam being spaced from the first contacting beam in said vertical direction; wherein
   the first contacting beam includes a tuber extending through the corresponding through hole for coupling to the corresponding module, and said ball spring beam is deflectable in the vertical direction.

2. The electronic device as claimed in claim 1, wherein the spring beam and the reinforcement beam have different thicknesses and different materials from each other.

3. The electronic device as claimed in claim 1, wherein both the second positioning portion and the first positioning portion are attached to the framework by an attaching pin.

4. The electronic device as claimed in claim 1, wherein said reinforcement beam is immovable.

5. The electronic device as claimed in claim 1, wherein said first positioning portion is offset from the first contacting beam in the vertical direction.

6. The electronic device as claimed in claim 5, wherein said second positioning portion is coplanar with said second contacting beam.

* * * * *